(12) United States Patent
Lee et al.

(10) Patent No.: US 10,794,078 B2
(45) Date of Patent: Oct. 6, 2020

(54) DAMPER FOR REINFORCING EARTHQUAKE RESISTANCE

(71) Applicant: KOREA ELECTRIC POWER CORPORATION, Naju-si (KR)

(72) Inventors: Kyung Jin Lee, Sejong (KR); Sang Hoon Oh, Busan (KR); Kwang Yong Choi, Miryang-si (KR); Kyung Won Hahm, Daejeon (KR)

(73) Assignee: KOREA ELECTRIC POWER CORPORATION, Naju-si (KR)

( * ) Notice: Subject to any disclaimer, the term of this patent is extended or adjusted under 35 U.S.C. 154(b) by 21 days.

(21) Appl. No.: 16/316,398

(22) PCT Filed: Aug. 22, 2018

(86) PCT No.: PCT/KR2018/009627
§ 371 (c)(1),
(2) Date: Jan. 9, 2019

(87) PCT Pub. No.: WO2019/132154
PCT Pub. Date: Jul. 4, 2019

(65) Prior Publication Data
US 2020/0181931 A1 Jun. 11, 2020

(30) Foreign Application Priority Data
Dec. 27, 2017 (KR) .......... 10-2017-0181611

(51) Int. Cl.
*E04H 9/02* (2006.01)
*F16F 7/12* (2006.01)

(52) U.S. Cl.
CPC .............. *E04H 9/021* (2013.01); *F16F 7/12* (2013.01)

(58) Field of Classification Search
CPC .......... E04H 9/021; E04H 9/02; E04H 9/028; E04H 2009/026; E04H 9/027; F16F 7/12
(Continued)

(56) References Cited

U.S. PATENT DOCUMENTS 5,382,008 A * 1/1995 Tyutinman .............. E04H 9/021
248/584
6,339,903 B1 * 1/2002 Zambelli ................... E04B 2/94
52/167.1

(Continued)

FOREIGN PATENT DOCUMENTS

JP 03163240 A * 7/1991
JP 2004-125076 A 4/2004
(Continued)

OTHER PUBLICATIONS

Office Action dated Feb. 12, 2020 of Japan Patent Application No. 2019-501981, which corresponds to the above referenced application.
(Continued)

*Primary Examiner* — Brian E Glessner
*Assistant Examiner* — Adam G Barlow
(74) *Attorney, Agent, or Firm* — Foundation Law Group, LLP

(57) ABSTRACT

A damper for reinforcing earthquake resistance according to the present invention includes a first supporting part mounted in a building structure, a second supporting part mounted on a support structure movably disposed to be separated from the building structure, and disposed to face the first supporting part, and a damper part connecting the first supporting part with the second supporting part and absorbing energy generated by an earthquake.

7 Claims, 8 Drawing Sheets

(58) Field of Classification Search
USPC .................................. 52/167.1, 167.6–167.8
See application file for complete search history.

(56) References Cited

U.S. PATENT DOCUMENTS

| | | | | |
|---|---|---|---|---|
| 6,397,528 | B1* | 6/2002 | Rahimian | E04H 9/02 52/167.1 |
| 6,729,080 | B1* | 5/2004 | Zambelli | E04B 2/94 52/167.1 |
| 2010/0107518 | A1* | 5/2010 | Heath | E04H 9/0237 52/167.3 |
| 2011/0131894 | A1* | 6/2011 | Vreeland | E04H 9/021 52/126.6 |
| 2011/0277397 | A1* | 11/2011 | Hohmann, Jr. | E04G 23/0222 52/167.1 |
| 2012/0038091 | A1* | 2/2012 | Tagawa | E04H 9/021 267/136 |
| 2012/0167490 | A1* | 7/2012 | Balducci | E04H 9/02 52/167.3 |
| 2013/0174501 | A1* | 7/2013 | Michael | E04H 9/02 52/167.1 |
| 2014/0000185 | A1* | 1/2014 | Wang | E04H 9/0215 52/167.8 |
| 2014/0174002 | A1* | 6/2014 | Mualla | E04H 9/0215 52/167.8 |

FOREIGN PATENT DOCUMENTS

| | | |
|---|---|---|
| JP | P2020-242450 A | 10/2010 |
| JP | 2011-074566 A | 4/2011 |
| JP | P5570605 B2 | 7/2014 |
| KR | 10-0940554 B1 | 2/2010 |
| KR | 10-1028239 B1 | 4/2011 |
| KR | 10-2011-0072412 A | 6/2011 |
| KR | 10-2012-0088684 A | 8/2012 |
| KR | 10-1400423 B1 | 5/2014 |
| KR | 10-1449930 B1 | 10/2014 |
| KR | 10-2016-0043945 A | 4/2016 |
| KR | 10-2016-0079431 A | 7/2016 |
| WO | WO 2011035809 A1 | 3/2011 |

OTHER PUBLICATIONS

Office Action dated Aug. 27, 2019 of Korean Patent Application No. 10-2017-0181611, which corresponds to the above referenced application.

* cited by examiner

DAMPER FOR REINFORCING EARTHQUAKE RESISTANCE

CROSS REFERENCE TO RELATED PATENT APPLICATION

This application claims the benefit under 35 U.S.C. Section 371, of PCT International Application No. PCT/KR2018/009627, filed on Aug. 22, 2018, which claimed priority to Korean Patent Application No. KR 10-2017-0181611, filed on Dec. 27, 2017, the disclosures of which are hereby incorporated by the references.

TECHNICAL FIELD

The present invention relates to a damper for reinforcing earthquake resistance, and more specifically, to a damper for reinforcing earthquake resistance which reinforces an earthquake resistance of a building structure when an earthquake occurs.

BACKGROUND ART

Recently, an earthquake of a magnitude 6 or more occurs in Korea, and a measure for securing seismic safety of a building is urgently needed. In Korea, a general building is seismically designed for a magnitude 6.6 earthquake, and high seismic costs are required when a building is designed in the conventional seismic design method in the case of occurrence of an earthquake of a magnitude 6.6 or more.

There is a need to develop an economical and efficient earthquake resistant system for a building with respect to a strong earthquake that may occur in a low-to-moderate seismic region such as Korea. The conventional method of reinforcing earthquake resistance for a conventional building or electric power structure is classified into a strength increasing type of resisting earthquake force by increasing a strength of a building, a toughness increasing type of absorbing earthquake energy by increasing the deformation performance of a building when earthquake force is applied, and an input decreasing type of decreasing a natural frequency of the building to be less than a predominant frequency of earthquake vibration or increasing damping using a vibration isolating device or a vibration damping device. Particularly, the input reducing type of the method of reinforcing earthquake resistance using the vibration damping device which allows energy generated when an earthquake occurs to be absorbed by the vibration damping device to decrease damage to a building has been studied, and various types of vibration damping devices have been developed.

The background of the present invention is disclosed in Korean Registration Patent No. 10-2016-0079431 (published on Jul. 6, 2016, title of invention: Damper for Reinforcing Earthquake Resistance).

DISCLOSURE

Technical Problem

The present invention is directed to providing a damper for reinforcing earthquake resistance which reinforces an earthquake resistance of a building structure when an earthquake occurs.

Technical Solution

One aspect of the present invention provides a damper for reinforcing earthquake resistance which includes a first supporting part mounted on a building structure, a second supporting part movably mounted on a supporting structure disposed to be separated from the building structure and disposed to face the first supporting part, and a damper part configured to connect the first supporting part with the second supporting part and absorb energy generated by an earthquake.

The damper part may include a first damper fixing part fixed to the first supporting part, a second damper fixing part fixed to the second supporting part, and a steel rod damper part configured to connect the first damper fixing part with the second damper fixing part, absorb energy transmitted from the first supporting part, and transmit the energy to the second supporting part.

The steel rod damper part may absorb energy while being deformed by the energy transmitted from the first supporting part.

The first supporting part may include a first horizontal part and a first vertical part installed on an end portion of the first horizontal part to be perpendicular to the first horizontal part, and the second supporting part may include a second horizontal part disposed to be separated from and parallel with the first horizontal part and a second vertical part installed on an end portion of the second horizontal part to be perpendicular to the second horizontal part.

The first supporting part may further include a first closing part configured to close opening sides between the first horizontal part and the first vertical part, and the second supporting part further includes a second closing part configured to close opening sides between the second horizontal part and the second vertical part, wherein the first closing part and the second closing part are each formed in a right triangle shape.

The damper may further include a plate part having one side on which a plurality of protruding parts, which are formed on the second supporting part to protrude toward the supporting structure, are formed to be vertically movable and having the other side fixed to the supporting structure.

The plate part may include a plate body part, and a long hole part formed in the plate body part at a position corresponding to each of the protruding parts, wherein the long hole part is formed in a long hole shape in a longitudinal direction of the building structure.

A shock absorbing part for absorbing shock transmitted from the second supporting part may be interposed between the second supporting part and the plate part.

The shock absorbing part may be formed of an elastically deformable material.

Advantageous Effects

According to a damper for reinforcing earthquake resistance of the present invention, a damper part vertically moves to decrease horizontal earthquake force and absorbs earthquake energy when horizontal seismic force is applied to a building structure, and thus an earthquake performance of the building structure can be improved.

Further, according to the present invention, the damper can be installed in the conventional building structure, and thus the building structure can be protected from earthquake with fewer installation costs and in less time.

MODES OF THE INVENTION

Figure 1:
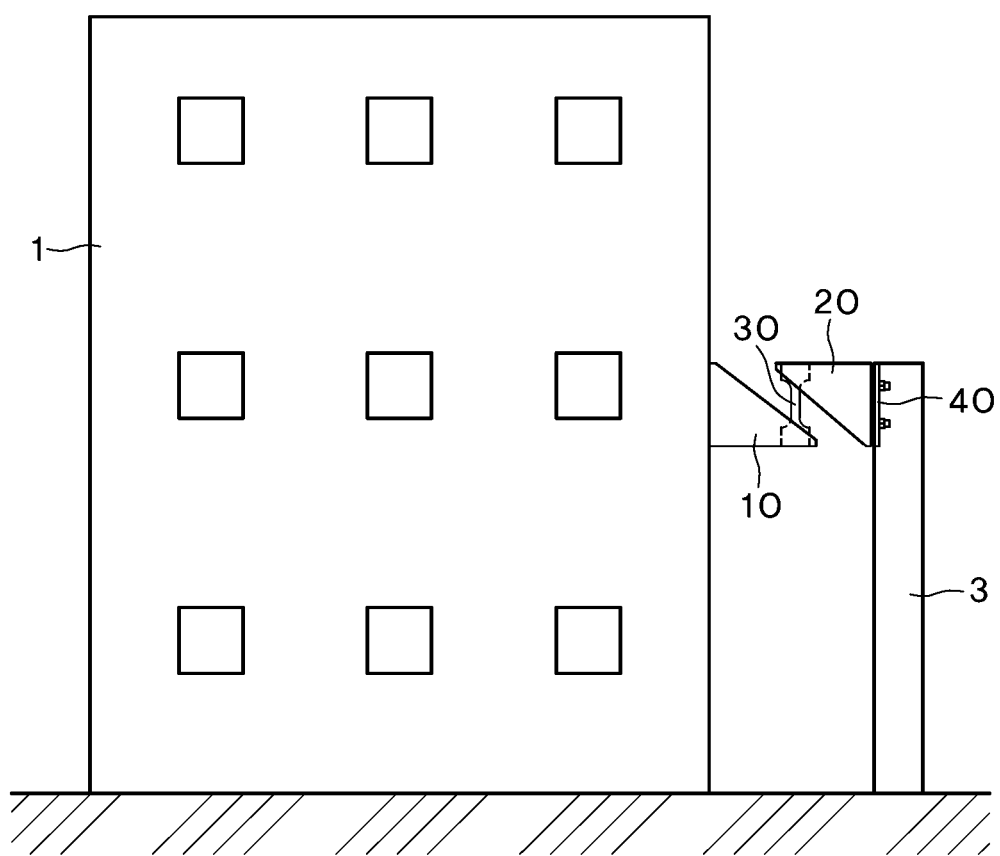
FIG. 1 is a front view schematically showing a damper for reinforcing earthquake resistance according to an embodiment of the present invention.

Hereinafter, a damper for reinforcing earthquake resistance according to the present invention will be described with reference to the accompanying drawings. In the drawings, thicknesses of lines or sizes of elements may be exaggeratedly illustrated for clarity and convenience of description.

The following terms are defined in consideration of the functionality of the embodiments of the present invention and may vary according to intentions of a user or an operator or according to usual practice. Therefore, the terms should be defined on the basis of the overall content of the specification.

Figure 2:
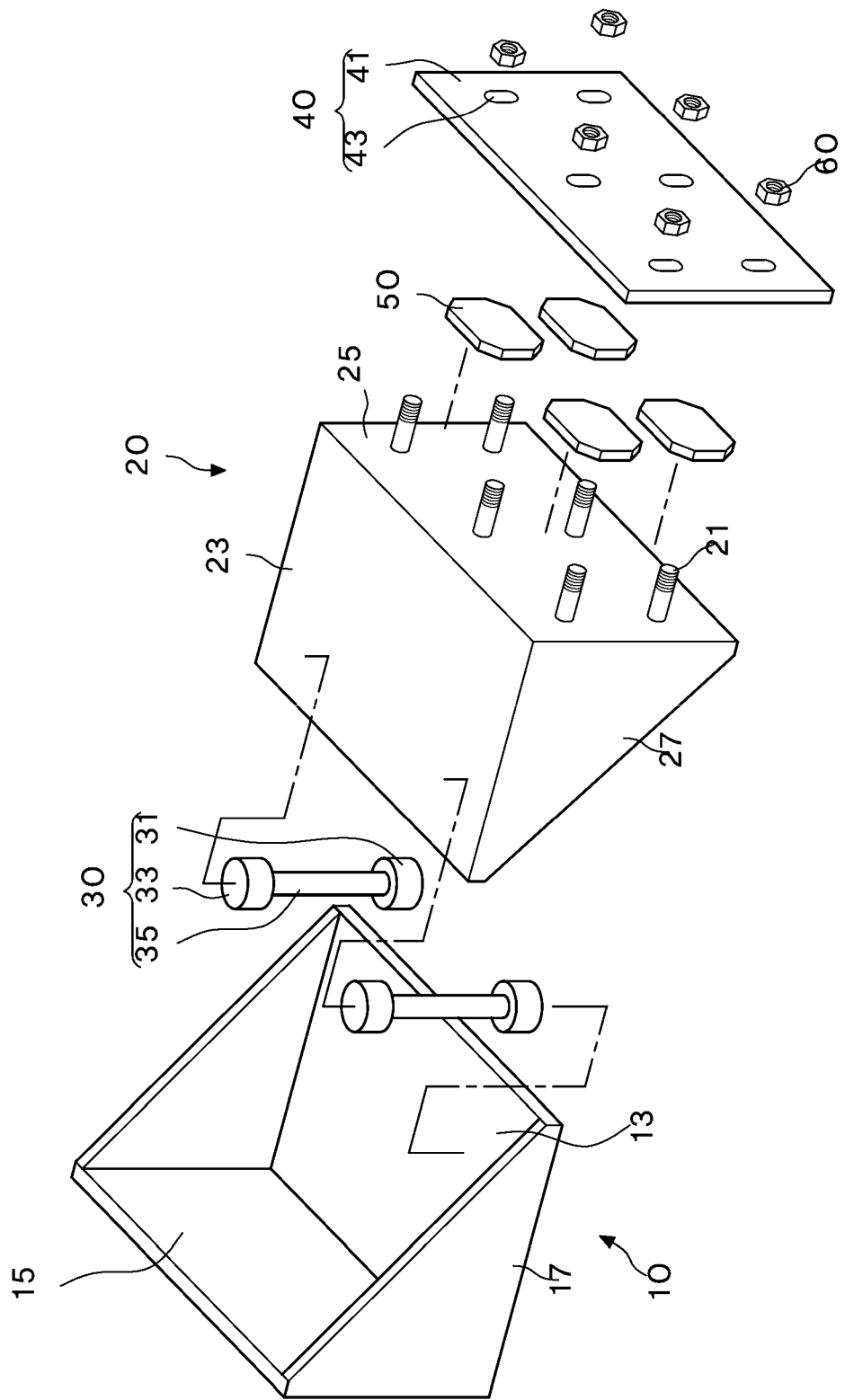
FIG. 2 is an exploded perspective view schematically showing the damper for reinforcing earthquake resistance according to the embodiment of the present invention.
Figure 3:
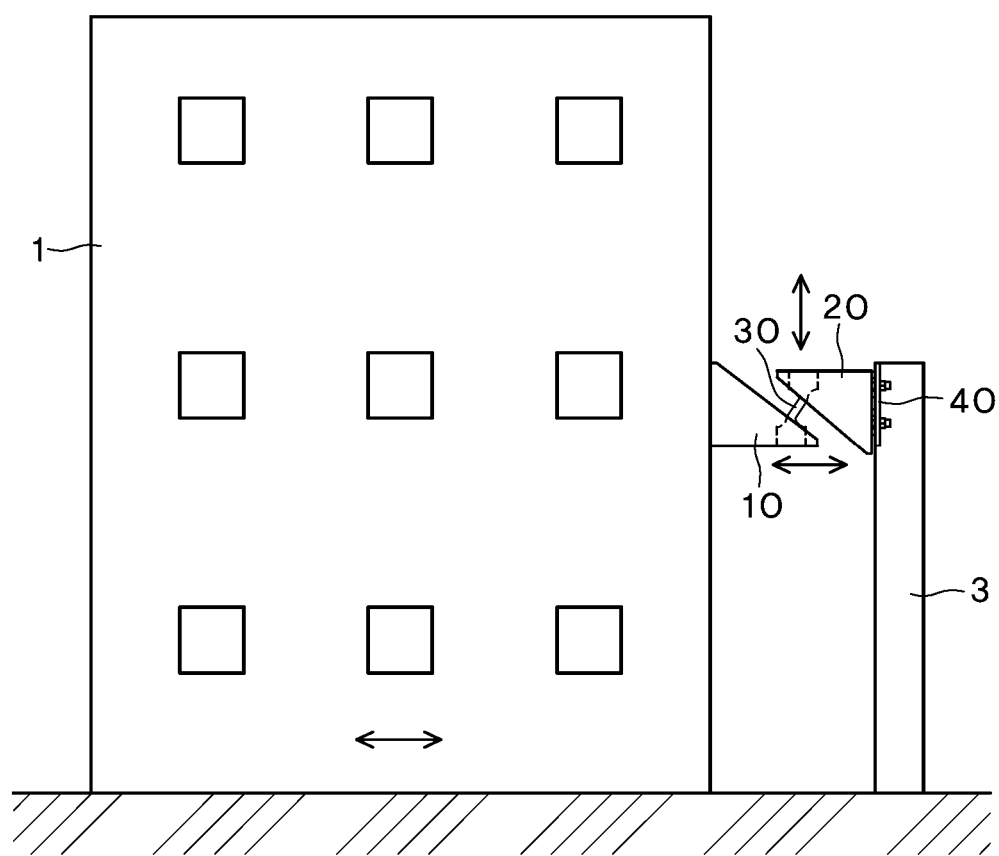
FIG. 3 is a front view schematically showing an operation of the damper for reinforcing earthquake resistance according to the embodiment of the present invention.
Figure 4:
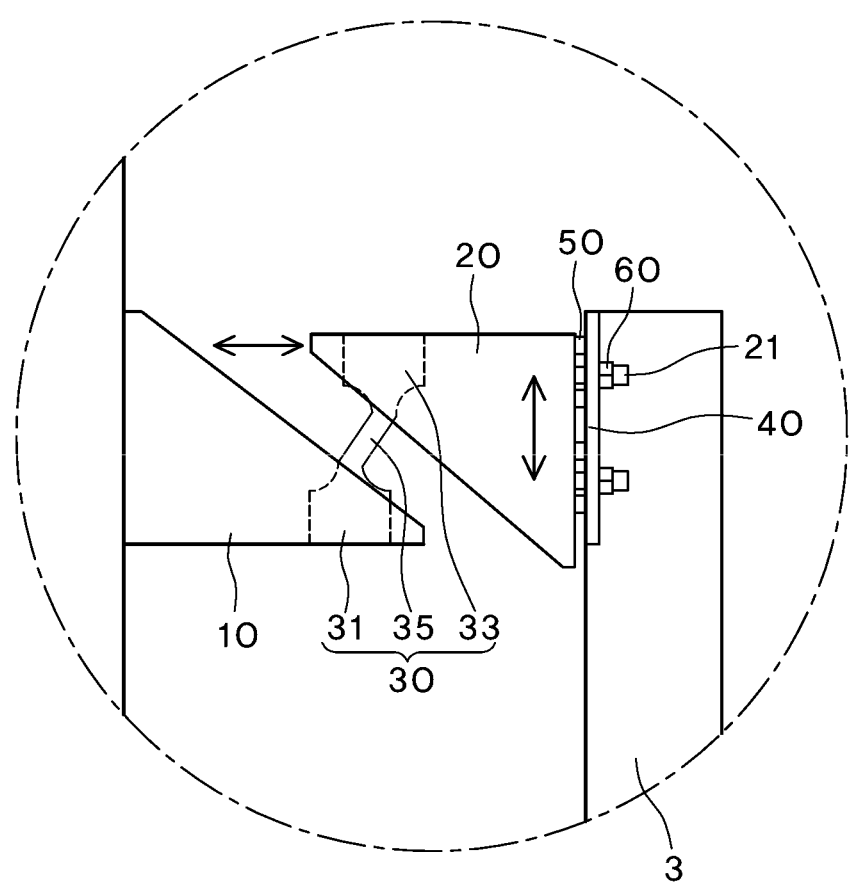
FIG. 4 is a partially enlarged view schematically showing the operation of the damper for reinforcing earthquake resistance according to the embodiment of the present invention.

FIG. 1 is a front view schematically showing a damper for reinforcing earthquake resistance according to an embodiment of the present invention, FIG. 2 is an exploded perspective view schematically showing the damper for reinforcing earthquake resistance according to the embodiment of the present invention, FIG. 3 is a front view schematically showing an operation of the damper for reinforcing earthquake resistance according to the embodiment of the present invention, FIG. 4 is a partially enlarged view schematically showing the operation of the damper for reinforcing earthquake resistance according to the embodiment of the present invention, and FIGS. 5 to 8 are views schematically showing operations of a steel rod damper part according to whether vertical force is generated when horizontal force is applied to the damper part of the damper for reinforcing earthquake resistance according to the embodiment of the present invention.

Referring to FIGS. 1 to 5, the damper for reinforcing earthquake resistance according to the embodiment of the present invention includes a first supporting part 10, a second supporting part 20, a damper part 30, a plate part 40, and a shock absorbing part 50.

The first supporting part 10, which is mounted on one surface (a right side in FIG. 1) of a building structure 1, is hollow and has a front cross-section having a right triangular shape when viewed from the front (see FIG. 2). The first supporting part 10 accommodates the damper part 30 in the hollow space thereof, and a first damper fixing part 31 of the damper part 30 is fixedly mounted on the inner surface of the first supporting part 10 (a lower inner surface, that is, a first horizontal part 13 in FIG. 2).

The first supporting part 10 includes the first horizontal part 13, a first vertical part 15, and a first closing part 17. The first horizontal part 13 is a flat plate disposed parallel to the ground. The first vertical part 15 is a flat plate installed on an end portion (a left end part in FIG. 2) of the first horizontal part 13 to be perpendicular to the first horizontal part 13, and the first closing parts 17 close both opening surfaces between the first horizontal part 13 and the first vertical part 15. The first closing part 17 is formed in a right triangular shape.

The second supporting part 20, which is movably mounted on one surface (a left side in FIG. 1) of a supporting structure 3, is disposed to face the first supporting part 10. The second supporting part 20 and the first supporting part 10 are disposed at the same level from the ground. The second supporting part 20 accommodates the damper part 30 in the hollow space thereof, and the second damper fixing part 33 of the damper part 30 is fixedly mounted to an inner surface (an upper inner surface, that is, a second horizontal part 23 in FIG. 2) of the second supporting part 20.

The second supporting part 20 includes a second horizontal part 23, a second vertical part 25, and a second closing part 27. The second horizontal part 23 is a flat plate disposed parallel with the first horizontal part 13. The second vertical part 25 is a flat plate installed on an end portion (a right end part in FIG. 2) of the second horizontal part 23 to be perpendicular to the second horizontal part 23, and the second closing parts 27 close both opening surfaces between the second horizontal part 23 and the second vertical part 25. The second closing part 27 is formed in a right triangular shape. The first closing part 17 is disposed in a regular right triangle shape, and the second closing part 27 is disposed in an inverted right triangle shape.

The second supporting part 20 is movably mounted on the supporting structure 3. The second supporting part 20 is mounted on the supporting structure 3 to be movable in a vertical direction and moves in a vertical direction (see FIG. 1) with respect to a horizontal force of an earthquake for the building structure 1 (see FIG. 1) so as to decrease the horizontal force of earthquake.

The damper part 30 connects the first supporting part 10 with the second supporting part 20 and absorbs energy generated by horizontal earthquake. The damper part 30 includes a first damper fixing part 31, a second damper fixing part 33, and a steel rod damper part 35.

The first damper fixing part 31 includes one side (a lower side in FIG. 2) fixed to a lower inner surface of the first supporting part 10 and the other side (an upper side in FIG. 2) connected to the steel rod damper part 35. The first damper fixing part 31 is coupled to the first supporting part 10 and the steel rod damper part 35 by bolting or welding. The first damper fixing part 31 and the steel rod damper part 35 are integrally formed through injection molding.

The second damper fixing part 33 has one side (an upper side in FIG. 2) fixed to an upper inner surface of the second supporting part 20 and the other side connected to the steel rod damper part 35. The second damper fixing part 33 is coupled to the second supporting part 20 and the steel rod damper part 35 by bolting or welding. The second damper fixing part 33 and the steel rod damper part 35 are integrally formed through injection molding.

The steel rod damper part 35 connects the first damper fixing part 31 with the second damper fixing part 33, absorbs energy transmitted from the first supporting part 10, and transmits the energy to the second supporting part 20. The steel rod damper part 35 absorbs the energy while being deformed by energy of an earthquake of a predetermined magnitude or more transmitted from the first supporting part 10. That is, the steel rod damper part 35 is formed of a metal rod with strength and hardness that is not deformed at a predetermined magnitude or less. In the embodiment of the present invention, a magnitude of earthquake at which the steel rod damper part 35 is deformed is set to 6 or greater.

A plurality of protruding parts 21 protrude from one surface of the second supporting part 20 (a right side in FIG. 2, that is, the second vertical part 25). A screw thread is formed on an outer circumferential surface of each of the protruding parts 21 to be screw-fastened with a nut part 60. The nut part 60 prevents the protruding parts 21 from being separated from the plate part 40. The nut part 60 vertically moves along a long hole part 43 of the plate part 40 together with the protruding parts 21.

The plate part 40 has one side (a left side in FIG. 2) mounted on the protruding part 21 of the second supporting part 20 to be vertically moved (see FIG. 1) and the other side (a right side in FIG. 2) mounted on the supporting structure 3. The plate part 40 is fixed to the supporting structure 3 by bolting or welding.

The plate part 40 includes a plate body part 41 and the long hole part 43. The plate body part 41 is formed in a rectangular plate shape fixed to the supporting structure 3. The long hole part 43 is formed at a position of the plate body part 41 corresponding to the protruding part 21 of the second supporting part 20 to pass through the plate body part 41. The long hole part 43 is formed in a long hole shape in a longitudinal direction of the building structure 1 (a vertical direction in FIG. 1).

The protruding parts 21 vertically move in a longitudinal direction of the long hole part 43 to decrease horizontal energy of an earthquake so as to protect the building structure 1 from shock caused by the earthquake.

The shock absorbing part 50, which is disposed between the second supporting part 20 and the plate part 40, absorbs shock transmitted to the plate part 40 from the second supporting part 20 when the protruding part 21 of the second supporting part 20 moves along the long hole part 43 in the vertical direction.

The shock absorbing part 50 is formed of an elastically deformable material and absorbs shock while being elastically deformed between the second supporting part 20 and the plate part 40. In the embodiment of the present invention, the shock absorbing part 50 may be made of rubber, silicone, and the like. Further, the shock absorbing part 50 is made of an abrasion resistant material to prevent abrasion between the second supporting part 20 and the plate part 40.

Figure 5:
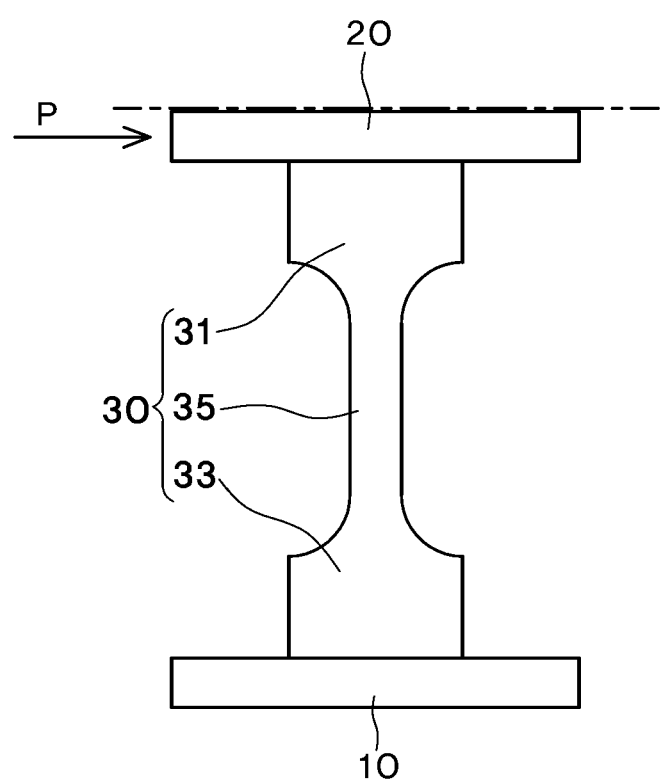
FIGS. 5 to 8 are views schematically showing operations of a steel rod damper part according to whether vertical force is generated when horizontal force is applied to the damper part of the damper for reinforcing earthquake resistance according to the embodiment of the present invention.

Referring to FIGS. 3 to 5, operations of the damper for reinforcing earthquake resistance according to the embodiment of the present invention will be described. The building structure 1 is weak to horizontal energy of earthquake when an earthquake of a predetermined magnitude or more occurs.

Figure 6:
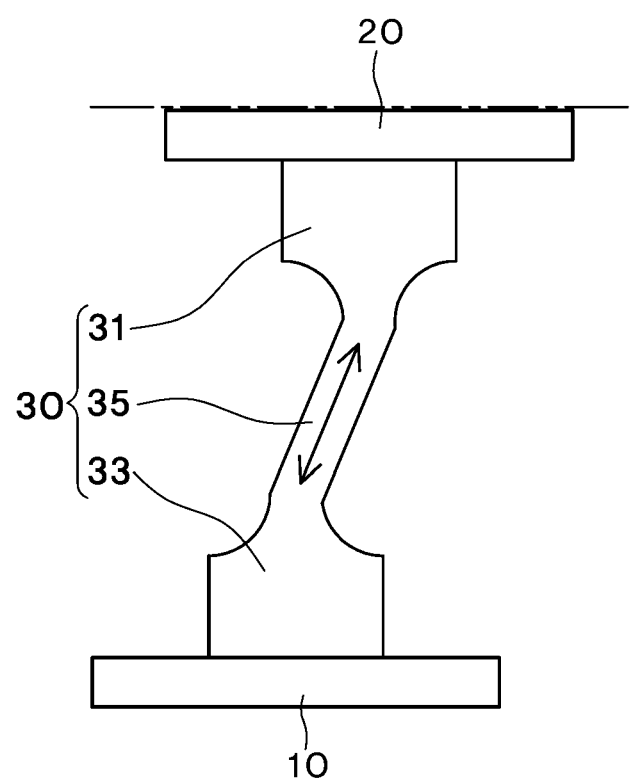
Figure 7:
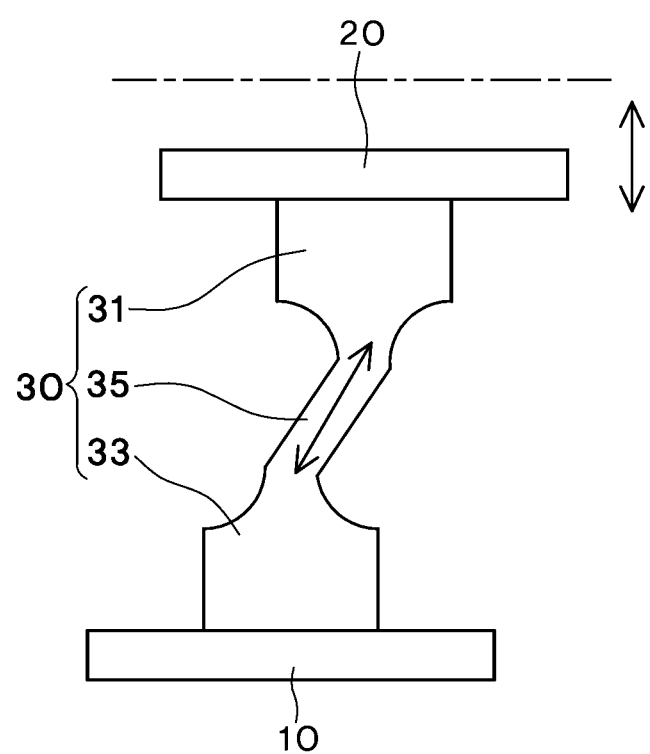
Figure 8:
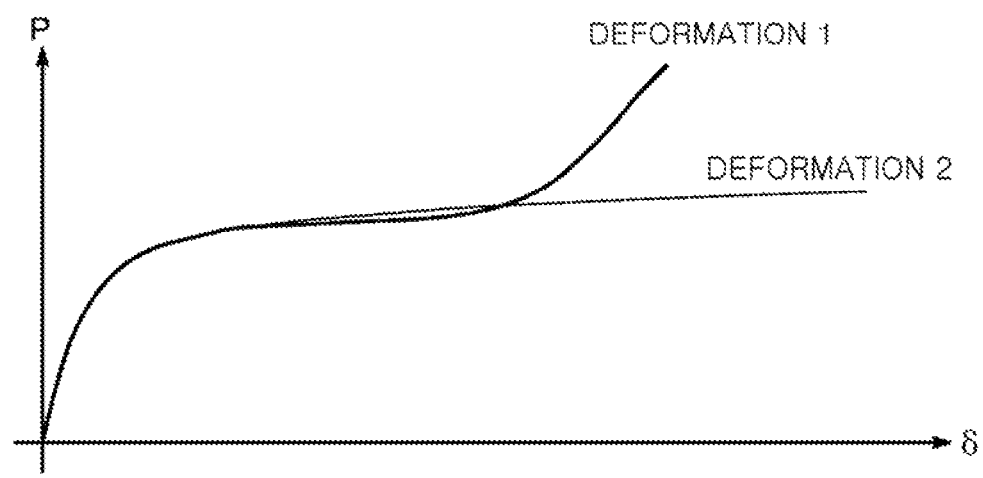

FIG. 5 shows a case in which earthquake force is not applied to the damper part 30, FIG. 6 shows deformation (deformation 1) in a case in which earthquake force is applied to the damper part 30 when upper and lower portions of the steel rod damper part 35 are fixed so that deformation of the steel rod damper part 35 is limited in a vertical direction, and FIG. 7 shows deformation (deformation 2) in a case in which earthquake force is applied to the damper part 30 when the steel rod damper part 35 is vertically movable. In FIG. 8, P refers to stress applied to the steel rod damper part 35, and 6 refers to the deformation of the steel rod damper part 35.

In the case of deformation 1 shown in FIG. 6, when deformation is not caused in a vertical direction to the horizontal force of earthquake, greater stress is generated in the steel rod damper part 35, and thus the steel rod damper part 35 is fractured.

In the case of deformation 2 shown in FIG. 7, the steel rod damper part 35 according to the embodiment of the present invention may decrease a horizontal force of earthquake when the protruding parts 21 vertically move along the long hole parts 43 of the plate part 40. Therefore, the steel rod damper part 35 can be prevented from being fractured, and earthquake resistance performance of the building structure 1 and safety during earthquakes can be improved.

According to the damper for reinforcing earthquake resistance according to the present invention, when horizontal seismic force is applied to the building structure 1, the damper part 30 vertically moves to decrease the horizontal seismic force and absorb earthquake energy, thereby increasing an earthquake resistance of the building structure 1.

Further, according to the present invention, the damper part 30 can be installed on the conventional building structure 1 to protect the building structure 1 from earthquakes with less installation time and costs.

The present invention has been described with reference to the examples illustrated in the drawings, but these are only exemplary examples. It should be understood by those skilled in the art that various modifications and equivalent other examples may be made. Therefore, the scope of the present invention is defined by the appended claims.

The invention claimed is:

1. A damper for reinforcing earthquake resistance, the damper comprising: a first supporting part mounted on a building structure;

a second supporting part movably mounted on a supporting structure disposed to be separated from the building structure and disposed to face the first supporting part;

the second supporting part further having protruding parts that protrude toward the supporting structure;

a damper part configured to connect the first supporting part with the second supporting part and absorb energy generated by an earthquake; and a plate part that is fixed to the supporting structure and having a plurality of apertures into which the protruding parts are disposed so that the second supporting part is vertically moveable.

2. The damper of claim 1, wherein the damper part includes:

a first damper fixing part fixed to the first supporting part;

a second damper fixing part fixed to the second supporting part; and a steel rod damper part configured to connect the first damper fixing part with the second damper fixing part, absorb energy transmitted from the first supporting part, and transmit the energy to the second supporting part.

3. The damper of claim 2, wherein the steel rod damper part absorbs energy while being deformed by the energy transmitted from the first supporting part.

4. The damper of claim 1, wherein the plate part includes:

a plate body part; and a long hole part formed in the plate body part at a position corresponding to each of the protruding parts, wherein the long hole part is formed in a long hole shape in a longitudinal direction of the building structure.

5. The damper of claim 1, wherein a shock absorbing part for absorbing shock transmitted from the second supporting part is interposed between the second supporting part and the plate part.

6. The damper of claim 5, wherein the shock absorbing part is formed of an elastically deformable material.

7. A damper for reinforcing earthquake resistance, the damper comprising:
- a first supporting part mounted on a building structure;
- a second supporting part movably mounted on a supporting structure disposed to be separated from the building structure and disposed to face the first supporting part; and
- a damper part configured to connect the first supporting part with the second supporting part and absorb energy generated by an earthquake;

wherein:

the first supporting part includes a first horizontal part, a first vertical part installed on an end portion of the first horizontal part to be perpendicular to the first horizontal part, and a first closing part configured to close opening sides between the first horizontal part and the first vertical part; and the second supporting part includes a second horizontal part disposed to be separated from and parallel with the first horizontal part, a second vertical part installed on an end portion of the second horizontal part to be perpendicular to the second horizontal part, and includes a second closing part configured to close opening sides between the second horizontal part and the second vertical part, wherein the first closing part and the second closing part are each formed in a right triangle shape.

* * * * *